US012667057B2

(12) United States Patent
Deforche et al.

(10) Patent No.: US 12,667,057 B2
(45) Date of Patent: Jun. 30, 2026

(54) GUTTER SYSTEM AND SET FOR USE IN A HYDROPONIC SYSTEM AND METHOD FOR CULTIVATING A CROP

(71) Applicant: GREEN PRODUCTION SYSTEMS BVBA, Mechelen (BE)

(72) Inventors: Frans André Victor Cornelius Deforche, Mechelen (BE); Olivier Luc Henriette Frans Deforche, Mechelen (BE)

(73) Assignee: GREEN PRODUCTION SYSTEMS BVBA, Mechelen (BE)

( * ) Notice: Subject to any disclaimer, the term of this patent is extended or adjusted under 35 U.S.C. 154(b) by 0 days.

(21) Appl. No.: 17/920,579

(22) PCT Filed: May 3, 2021

(86) PCT No.: PCT/IB2021/053676
§ 371 (c)(1),
(2) Date: Oct. 21, 2022

(87) PCT Pub. No.: WO2021/224754
PCT Pub. Date: Nov. 11, 2021

(65) Prior Publication Data
US 2023/0180675 A1 Jun. 15, 2023

(30) Foreign Application Priority Data
May 4, 2020 (BE) .................................. 2020/5289

(51) Int. Cl.
*A01G 9/00* (2018.01)
*A01G 9/04* (2006.01)
*A01G 9/14* (2006.01)

(52) U.S. Cl.
CPC .............. *A01G 9/047* (2013.01); *A01G 9/143* (2013.01)

(58) Field of Classification Search
CPC ........ A01G 9/047; A01G 9/028; A01G 9/029; A01G 9/0293; A01G 31/02; A01G 31/06
See application file for complete search history.

(56) References Cited

U.S. PATENT DOCUMENTS

| | | |
|---|---|---|
| D718,847 S | 12/2014 | Creighton |
| 11,445,667 B2 * | 9/2022 | Xin .......................... A01G 9/02 |

(Continued)

FOREIGN PATENT DOCUMENTS

| | | |
|---|---|---|
| EP | 3254557 A1 | 12/2017 |
| JP | H06311830 A | 11/1994 |
| WO | 2017000046 A1 | 1/2017 |

OTHER PUBLICATIONS

International Search Report and Written Opinion, dated Aug. 11, 2021, for Application No. PCT/IB2021/053676 (13 pages).

*Primary Examiner* — Joshua J Michener
*Assistant Examiner* — Henry Hooper Mudd
(74) *Attorney, Agent, or Firm* — KDW Firm PLLC

(57) ABSTRACT

A gutter system for use in a hydroponic system for cultivating a crop includes a gutter and an upper surface. Arranged in the upper surface are a plurality of openings which are mutually separated in a longitudinal direction of the gutter, such that the gutter forms a channel in which substrates for having crop units of the crop grow therein are placeable via the openings. The upper surface is provided at the position of each of the plurality of openings with a flange which extends substantially perpendicularly relative to the upper surface from an edge of the opening and as such forms a stop for a respective substrate of the substrates.

13 Claims, 8 Drawing Sheets

(56)　　　　　References Cited

U.S. PATENT DOCUMENTS

| | | | | |
|---|---|---|---|---|
| 11,991,962 | B2 | 5/2024 | Chankrakanthan | |
| 2005/0274073 | A1* | 12/2005 | Brooke | A01G 31/06 |
| | | | | 47/59 R |
| 2012/0324787 | A1* | 12/2012 | Daas | A01G 9/02 |
| | | | | 47/65.8 |
| 2014/0041297 | A1 | 2/2014 | Miel | |
| 2017/0339855 | A1* | 11/2017 | Spets | A01G 31/06 |
| 2018/0325053 | A1* | 11/2018 | Gallant | A01G 31/02 |
| 2019/0021249 | A1* | 1/2019 | Ivanescu | A01G 31/06 |
| 2020/0305368 | A1* | 10/2020 | Ross | A01G 31/02 |
| 2021/0195853 | A1* | 7/2021 | Barnes | A01G 18/70 |

* cited by examiner

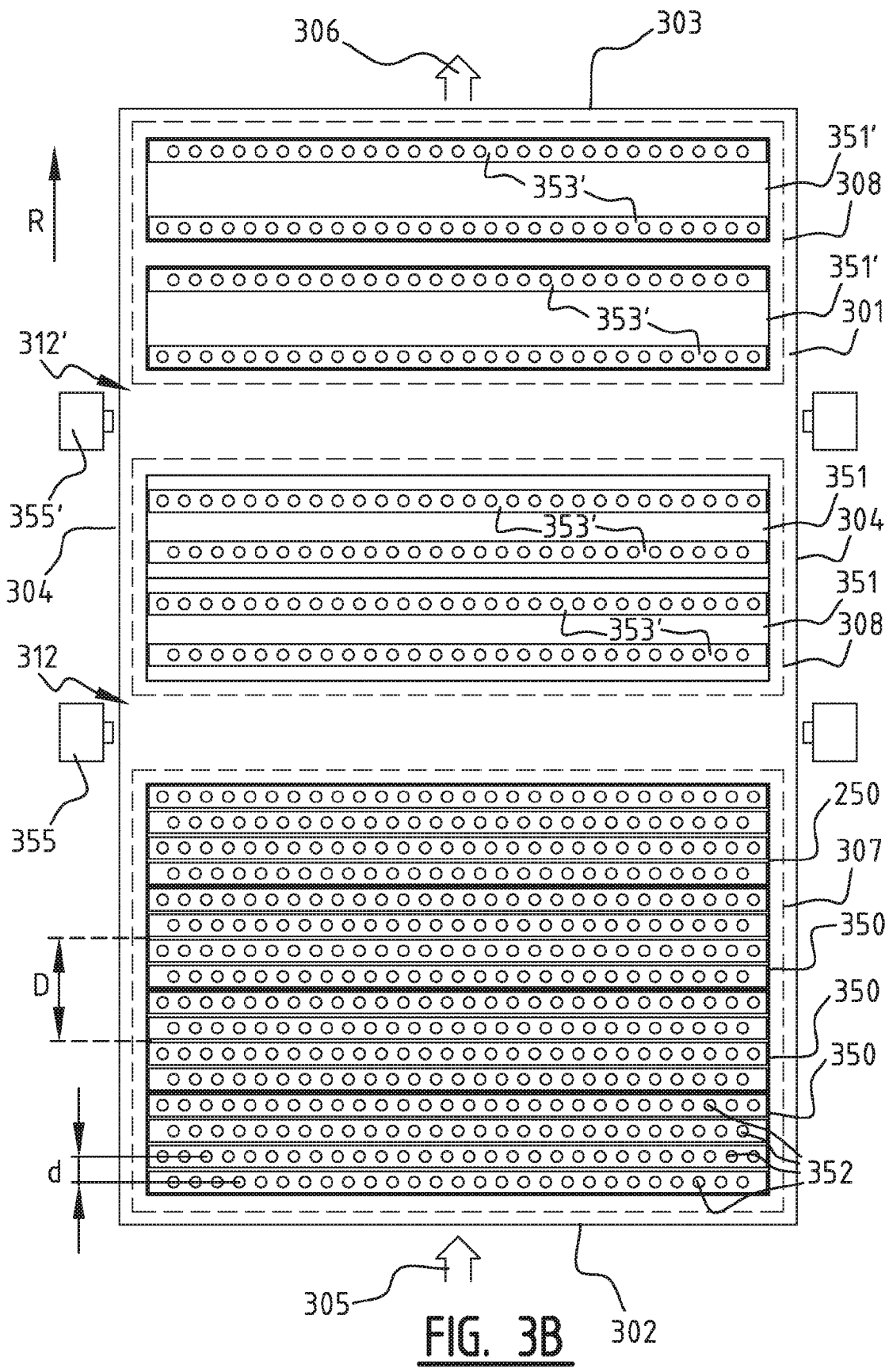
<u>FIG. 3B</u>

GUTTER SYSTEM AND SET FOR USE IN A HYDROPONIC SYSTEM AND METHOD FOR CULTIVATING A CROP

This application is a national stage filing under 35 U.S.C. 371 of pending International Application No. PCT/IB2021/053676, filed May 3, 2021, which claims priority to Belgian Patent Application No. 2020/5289, filed May 4, 2020, the entirety of which applications are incorporated by reference herein.

The invention relates to a gutter system for use in a hydroponic system for cultivating a crop. The invention relates particularly to a gutter system for use in a hydroponic system for cultivating a crop, comprising a gutter and an upper surface, wherein arranged in the upper surface are a plurality of openings which are mutually separated in a longitudinal direction of the gutter, such that the gutter forms a channel in which substrates for having crop units of the crop grow therein are placeable via the openings.

Hydroponics is the growing of plants in water to which the necessary nutrients have been added. It is a cultivation method which is applied increasingly often, not only for house plants but also for cultivation of vegetables in a protected space (glasshouse or building) or outside. Tomato, chicory, lettuce and other crops can for instance be cultivated using hydroponics. An important advantage of hydroponics relative to soil cultivation is that water and nutrients can be dosed in simple and precise manner. Soil-bound diseases usually do not occur, and there is thereby much less need for treatment with agents against disease. A further advantage of hydroponics relative to traditional cultivation in the soil is that water consumption can be 30% less than in the case of hydroponics.

Cultivation of a crop in hydroponics typically comprises multiple stages. A first stage is the sowing and germination stage. Different units of medium (substrate) are first placed in a receptacle or tray, optionally packaged in a pot, wrapped in a net or paper, or in a soil block. One or more seeds are then placed in or on the medium. The number of crop units per square metre varies in this stage from 200 to more than 1000, depending on the dimensions of the medium and the type of seed. The germination stage takes place in a germination chamber (germination cell). Temperature and moisture are mainly controlled here in order to bring about optimal germination of de seed. After germination, the receptacles/trays are displaced from the germination space to the glasshouse, where the plants can grow to a determined size. This is the raising stage. After the raising stage, the plants are usually moved from a plant grower to a market gardener. At the market gardener with a hydroponic system in gutters the plants will first be transplanted to a tray. One density of 100 per m² is usually applied. This stage is referred to as the extended raising stage. Water, optionally with fertilizers, is supplied onto the tray via overhead irrigation. The extended raising stage is followed by the cultivation stage. In the cultivation stage the plants are typically placed in gutters (which thus differ from the above stated tray), which are provided to slide apart as the crop grows, such that the crop has space to reach full growth while the surface area is utilized optimally.

WO 94/07354 describes a system of movable gutters for cultivating a crop. This system is typically used in the cultivation stage. WO 94/07354 describes a system for cultivating a crop with a guide for guiding a plurality of gutters in a predetermined area, wherein each gutter is provided to contain a plurality of crop units of a crop and wherein the guide is provided to guide the gutters in a first direction extending from a first edge to a second edge of the area, wherein the guide is further provided to gradually increase the distance between adjacent gutters in said direction, such that the number of crop units per m² in the area substantially decreases from the first edge to the second edge. A surface area in a glasshouse can in this way be utilized optimally when hydroponics is applied, wherein the advantages of hydroponics relative to soil cultivation are described above.

WO 2017/000046 A1 describes a more specific system, wherein the area comprises a first zone adjacent to the first edge and a second zone adjacent to a second edge, and wherein each gutter in the first zone is provided to contain crop units with a first intermediate distance and wherein each gutter in the second zone is provided to contain crop units with a second intermediate distance, wherein the first intermediate distance is considerably smaller than the second intermediate distance, and wherein the distance between adjacent gutters in the first zone at the position of a transition from the first zone to the second zone is considerably greater than the distance between adjacent gutters in the second zone at the position of the transition.

Because the area with gutters comprises in the case of WO 2017/000046 A1 two zones and the crop units in the first zone are positioned considerably closer together in the gutters, it is possible in this first zone to optimally fill the available surface area with plants which are considerably smaller than in a gutter system according to WO 94/07354. The gutters in the first zone move apart as the small plant grows, until the transition location between the first zone and the second zone is reached. The plants or crop units are then at least partially transplanted to the second zone, where the intermediate distance in the longitudinal direction of the gutter between the crop units is considerably greater than in the first zone. The plants are hereby given considerably more space in the longitudinal direction of the gutter, and the distance between adjacent gutters can therefore be considerably reduced. It is noted here that the plants of the mutually adjacent gutters are preferably positioned in a triangular pattern. The gutters can then be moved apart in the second zone as the crop grows, such that the crop can be harvested when the gutters reach the second edge and the crop has then also reached full growth.

In the context of this application a crop unit can comprise one or more plants, optionally of the same type of crop. Although it is usual to cultivate a plurality of the same type of crop unit in one gutter, it is also possible to envisage cultivating different types of crop in one gutter.

According to WO 2017/000046 A1, each gutter comprises a plurality of means for containing a crop unit, this plurality of means having predetermined intermediate distances in the longitudinal direction of the gutter. The gutters are here preferably substantially tubular or U-shaped in cross-section with a cover (lid), wherein the plurality of means are formed as openings in the tube or cover, wherein each opening is formed to contain one or more crop units such that a substrate in which the crop unit grows and roots of the crop unit are situated substantially under the cover while leaves of the crop unit are situated substantially above the cover. This gutter construction is found to have a number of advantages, the intermediate distance between adjacent crop units is on the one hand predetermined and can thus be optimized. The cover will on the other hand ensure that less light reaches the roots of the crop units, so that these roots can grow. The cover further ensures that water in the gutter does not evaporate directly from the gutter.

Despite the means for containing a crop unit, which thus consist of an opening in the tube or cover, a problem occurs during harvesting of the crop units. This is because, during harvesting, the gutter is moved along a blade with which crop units are cut from their substrate with roots. A part of the substrate, or a pot in which the substrate is placed, in which the crop unit grows is here however frequently touched by the blade, whereby the substrate moves and thereby impedes the cutting and/or fouls the crop unit, which is also referred to as contamination.

The invention has for its object to provide at least a partial solution to this problem.

According to the invention, the (partial) solution is found in a gutter system for use in a hydroponic system for cultivating a crop, comprising a gutter and an upper surface, wherein arranged in the upper surface are a plurality of openings which are mutually separated in a longitudinal direction of the gutter, such that the gutter forms a channel in which substrates for having crop units of the crop grow therein are placeable via the openings.

According to the invention, the gutter system has the feature that the upper surface is provided at the position of each of the plurality of openings with a flange which extends preferably downward from an edge of the opening and as such forms a stop, preferably under the upper surface, for a respective substrate of the substrates. The upper surface can be formed integrally with the gutter or can be placed on the gutter as a lid.

By means of the stop under the upper surface a substrate can be held in place during harvesting of the crop unit growing in this substrate. Because the stop is formed just below the upper surface, the substrate can be contained without it extending to the upper surface. It is thereby possible for the substrate to be situated slightly below the upper surface. It is hereby prevented during harvesting, which, as already described above, takes place by moving the gutter along a blade, that the blade comes into contact with the substrate. This facilitates harvesting. If the blade were to come into contact with the substrate, this would result in contamination of the crop unit, whereby the gutter system according to the invention thus contributes to the prevention of contaminated crop units and the drawbacks associated therewith. Facilitating the harvesting is further useful because human contact with the crop units can thus be limited. Human contact can form a source of contamination of the crop units, and can thus be prevented at least partially by means of the flange.

Alternatively or additionally, the flanges can extend upward from the upper surface and form a stop for substrates just above the upper surface. In that case the substrates can thus extend to a position above the upper surface. An upward extending flange provides the advantage that the stop is formed relatively high, i.e. above the upper surface. Since the gutter will move underneath a blade for the purpose of harvesting the plant, wherein the blade is situated above the upper surface, a stop above the upper surface provides stability close to the location of the blade. This facilitates cutting, and therefore harvesting.

When the flange extends upward, a relatively high substrate can be used. The same gutter can hereby be made suitable for a type of crop which requires such a relatively high substrate.

Particularly if they extend upward from the upper surface, the flanges can be provided at their free end with an optionally gradual widening. Owing to the gradual widening, substrates can be placed through the flanges more easily.

The skilled person will appreciate that, although the stops are mentioned here in relation to substrates, they can of course be used to contain parts of the packaging for substrates. It is particularly possible to envisage using the stop to contain a holder such as a flexible casing, in which casing a substrate such as potting compost, bark or another suitable medium is placed, in which a crop unit is in turn cultivated.

The skilled person will further appreciate that, when a displacement of harvesting means, such as the blade, relative to the gutter is defined in this application, it is of course possible to arrange the harvesting means at a fixed position and to displace the gutter relative to the harvesting means, and vice versa.

It is also noted, perhaps unnecessarily, that the blade can be both fixed and translating and/or rotating.

In an embodiment of the gutter system according to the invention each flange extends over substantially the whole edge of the respective opening.

In this embodiment the flange can form a stop in every direction in the plane of the opening, and thereby contain the respective substrate particularly well. This may further facilitate harvesting.

The openings particularly take a substantially circular form, and the flanges the form of hollow cylinders. In this way the gutter system is highly suitable for substrates with a round cross-section.

In another embodiment of the gutter system according to the invention a chamfering which connects the upper surface to the flange is provided at the edge of each opening in order to thus simplify access of the substrate to the channel through the opening.

The chamfering provides a guide which runs, optionally tapered, from a position above the upper surface, through the respective opening and toward the channel. A substrate is thereby pushed away from the edge of the opening when introduced. The introduction can hereby be facilitated and/or damage to the substrate can be prevented. Contamination of the upper surface due to introduction of the substrate is also minimized.

In yet another embodiment of the gutter system according to the invention the upper surface, the flange and the chamfering are formed integrally from one piece. This embodiment has been found to be particularly practical and can additionally or instead be manufacturable in relatively simple manner.

Alternatively, each flange can be formed by a tube which is connectable to the upper surface of the gutter system. Tubes can for instance be clamped in an opening in the upper surface intended for this purpose.

In yet another embodiment of the gutter system according to the invention the gutter system further comprises a lid for the gutter, wherein the lid comprises the upper surface and wherein the lid and the gutter are releasably connectable.

Using the lid, the gutter can be closed for use. The lid then closes the channel, whereby less light is able to reach the substrates in the channel. This enhances the root development of the crop units in the substrates. Because the lid is removable, the gutter can be easily cleaned after harvesting. This can be done particularly by turning over the gutter after removing the lid, whereby substrates and any other impurities fall from the channel. Following this, the gutter can optionally be flushed or treated with steam. The lid can be cleaned with for instance steam as well, after which both the lid and the gutter are reusable for cultivating a new number of crop units, for instance by fitting the lid back on the gutter.

The gutter of the gutter system according to the invention can have any length, preferably a length of at least 7 metres, preferably of at least 10 metres and more preferably of at least 12 metres. In this way a plurality of crop units can be placed in one gutter. When the gutters have these lengths, installing a system for automatic displacement of the gutters from a first edge to a second edge is economically cost-effective. It is possible to opt for a length roughly equal to 12 metres.

In yet another embodiment of the gutter system according to the invention a pitch distance between two adjacent openings of an upper surface is greater than 1.5 cm, preferably greater than 2 cm, and more preferably greater than 2.5 cm, and smaller than 10 cm, preferably smaller than 7 cm and more preferably smaller than 5 cm. Such a pitch distance is particularly suitable for cultivating crop units such as lettuce, herbs, leaf crops and/or other small crops.

The invention also relates to a set comprising a gutter system with lid as described above, wherein the set comprises a further lid which comprises a further upper surface and is releasably connectable to the gutter, wherein arranged in the further upper surface are further openings which are mutually separated in a longitudinal direction of the further lid.

Such a set can be used to cultivate different types of crop unit using the same gutter. Because a further lid is provided, it can be adapted specifically to a further type of crop unit, while the first lid can be adapted specifically to a first type of crop unit.

The adaptation can be achieved by having a pitch distance and/or cross-sectional dimension of the openings differ from respectively a further pitch distance or further cross-sectional dimension of the further openings. The further lid can also be used for the same type of crop unit as the first lid, only in a different stage of development of the crop units. The further lid can also differ from the lid due to the dimensions and/or the direction of the flange. Flanges of the lid can for instance extend downward, while flanges of the further lid extend upward. In this way the same gutter can be used to cultivate different crops, by selecting the appropriate lid.

The invention also relates to a method for cultivating a crop, comprising the steps of:

providing a gutter system as described above;

providing substrates at the position of the openings in the channel;

allowing crop units to grow in the substrates;

displacing the upper surface underneath cutting means in a first direction in order to thus separate at least a part of the crop units from the respective substrates, wherein each flange forms in the first direction a stop for each respective substrate in order to limit displacement of the substrate in at least the first direction and so facilitate separation of the crop units from the respective substrates.

The use of a gutter system for cultivating a crop enables a large section of an available surface to be used to cultivate crops. As explained above, in harvesting from known gutter systems the problem however arises that (optionally packaged) substrates in which crop units grow may be touched by a blade. By using a gutter system with said flange as according to the invention a stop is formed in the direction in which the gutter moves relative to the cutting means, i.e. said first direction. In this way displacement of the substrates is counteracted, and it is also prevented that the substrates have to extend above the upper surface. This reduces or prevents the danger of the cutting means touching the substrates, which at least partially obviates the drawbacks of a contaminated crop associated therewith.

The method is particularly performed with a gutter system with a lid as described above, wherein the method comprises the steps of:

releasing the lid from the gutter;

removing the substrates from the channel and cleaning the gutter and the lid at least in this way.

In this way the gutter can be cleaned and reused in simple manner.

It is possible to use the gutter system in a hydroponic system as described below.

By transplanting the crop units, as proposed in WO 2017/000046 A1, it is achieved that the crop units are given more space. Although this is advantageous, the transplanting results in a great deal of extra work. Particularly when the production capacity of the hydroponic system is scaled up, it is not or no longer possible to transplant crop units quickly enough in an economically cost-effective manner. This problem can of course be solved by simply reducing the number of plants, but this decreases the capacity of the whole hydroponic system.

It is therefore an object of the gutter system described below to solve this capacity problem at least partially.

This object is achieved with a hydroponic system comprising a guide for guiding a plurality of carriers in a predetermined area, wherein the guide is configured to guide the carriers in a first direction which extends from a first edge to a second edge of the area, wherein each carrier is configured to carry at least two parallel gutters, and wherein at least one of the at least two gutters is removable from the carrier, and wherein each gutter is configured to contain a plurality of crop units of the crop.

Using the hydroponic system as described here a plurality of gutters can be carried simultaneously by a carrier. The carrier is in turn guided by the guide. After a determined period, in which the crop units have been able to grow in the gutters, at least one of the gutters of a carrier can be removed from this carrier. The crop units in the gutter or gutters which remain on the carrier thereby have more space. By coordinating the moment of removal of the at least one gutter with the growth progress of the crop units a great surface density of crop units can be achieved in that at first a relatively large number of crop units, this followed by fewer crop units, are present per unit area, in accordance with the size of the crop units. The hydroponic system as described here is particularly suitable to be scaled up because individual transplanting is not necessary. This is because a plurality of crop units can be given more space simultaneously by removing them from the carrier per gutter. Displacement thereby need take place only by the gutter, rather than each crop unit having to be transplanted individually.

It is also noted here that the hydroponic system as described here operates on the basis of a different principle than known hydroponic systems. The known system of WO 2017/000046 A1 for instance gives crop units more space in the longitudinal direction of the gutters by means of transplanting, while, as described here, more space is conversely provided in a direction transverse to that longitudinal direction, and individual transplanting has fewer advantages.

In addition, the hydroponic system as described here can provide the advantage that, because gutters are carried by carriers, they need be less rigid themselves. This is because the carrier can be used to largely support the gutter. The gutters therefore need not be self-supporting. Accordingly, gutters can take a relatively narrow form without using for instance an expensive material or a large amount of material. This has the advantage that when gutters are placed adjacently of each other, the openings in these gutters are situated relatively close together. The number of openings per unit area is thereby thus relatively great, which is particularly favourable for making optimal use of the surface area when the crop units are relatively small. This allows a density of crop units to be optimized at the position of the first edge, and so the capacity of the whole hydroponic system to be optimized.

The hydroponic system as described here can further provide the advantage that human contact with the crop units is not necessary, or is necessary to lesser extent. This is because displacing the crop units per gutter makes individual transplanting unnecessary, whereby human contact is also unnecessary or less necessary.

The fact that the carriers are configured to carry a plurality of gutters is understood to mean that the carriers can carry the gutters simultaneously. The gutters can be carried by the carrier adjacently of each other, substantially parallel to each other, so substantially parallel to each other in longitudinal direction. Adjacent gutters can be carried against each other or with a for instance relatively small intermediate space.

The gutters of the hydroponic system are particularly provided with precisely one row of openings, which preferably runs in the longitudinal direction of the gutter and/or is centred as seen in a width direction of the gutter.

The gutters can particularly have a height dimension and a width dimension, wherein the height dimension is greater than a width dimension. Giving the gutters a relatively narrow form allows many crop units to be grown per unit area. The hydroponic system as described here is particularly advantageous for such narrow gutters because the narrow gutters, which can be unstable on their own precisely because of their relatively small width dimension, are carried by the carriers. It is also noted here that it has not been usual heretofore to use gutters with a height dimension greater than the width dimension, precisely because they are too unstable. Facilitating the use of such gutters can be advantageous in many ways, for instance in that the discharge of nutrient solution can be facilitated by the narrow gutters, which is precisely why longer gutters can be used. This can contribute to the possibility of increasing the capacity of a hydroponic culture.

The use of the combination of narrow gutters and carrier can otherwise enable central harvesting of crop units, which limits the amount of labour and transport required for harvesting.

Using a plurality of gutters in one carrier also produces the advantage that different crop types are first cultivated together in one carrier and are later separated from each other by removing a gutter from the carrier. The hydroponic system can hereby be utilized more flexibly.

It is possible to further configure the guide of the hydroponic system to gradually increase the distance between adjacent carriers in the first direction. In this way the distance between adjacent carriers is for instance not increased in the first zone, and increased in the second zone. If each carrier carries precisely two gutters, the distance between adjacent carriers is preferably increased in the first zone. In a carrier carrying more than two gutters the distance between adjacent carriers is preferably not increased in the first zone. In the second zone the distance between the adjacent carriers is preferably increased gradually, irrespective of the number of gutters carried by each carrier, for instance as a function of the (predicted) size of the crop units in that zone.

In this way more space is created per carrier in the first direction for the crop units as they grow larger.

In an embodiment of the hydroponic system as described here the area comprises a first zone adjacent to the first edge and a second zone adjacent to the second edge, wherein the system comprises at the position of a transition from the first zone to the second zone gutter displacing means for removing at least one gutter from each carrier.

The at least one gutter can be removed from the carrier by means of the gutter displacing means. This results in a particularly efficient system which can function largely without human labour.

The gutter displacing means can also be configured to displace, after removal of the at least one gutter, at least one other gutter on the carrier. A desired distribution of gutters on the carrier can hereby be achieved.

The hydroponic system is not limited to just two zones. It is for instance possible to add one or more zones. If necessary, gutter displacing means can be placed at the position of a transition to the added zones.

The gutter displacing means are particularly configured to move the at least one removed gutter to a further carrier.

The gutter which was removed from the carrier of the first zone can hereby be guided into the second zone while carried by the further carrier, so that the crop units in this gutter can continue to grow. The at least one removed gutter can be placed at any desired position as seen in the longitudinal direction of the further gutter and/or carrier. The at least one removed gutter can optionally be displaced to the further carrier closer to the first edge or conversely closer to the second edge.

It is possible to provide the hydroponic system with supply means for supplying the further carrier at the position of the transition.

In this way gutters which are removed from carriers of the first zone can be placed on the further carriers. Sufficient space can hereby also be provided for the crop units in these gutters. It is possible to place a plurality of gutters on a further carrier.

It is for instance possible to provide three gutters per carrier in the first zone, and to remove a gutter from each carrier by means of the gutter displacing means. For every two carriers of the first zone a further carrier can then be supplied, on which the two gutters removed from those carriers can then be placed. All gutters in the second zone are therefore carried by a carrier per two. The same principle can be used for any suitable number of gutters per carrier. It is also possible to provide carriers in the first zone with a different number of gutters, for instance four. In that case two gutters can for instance be removed from the carriers in the transition. Providing each carrier with four gutters and removing two gutters thereof at the position of the transition creates the advantage that precisely one further carrier is needed per carrier to carry the removed gutters, and so arrive at a constant number of two gutters per carrier in the second zone. Such a system can be configured in relatively simple manner, for instance by having each carrier carry in addition to the four gutters a second carrier, which can then serve as further carrier for the removed gutters.

As an alternative to the supply means, each carrier, referred to in this context as first carrier, can carry a second carrier. This is for instance possible by in each case stacking the first and second carriers, and having the second carriers carry the gutters. For this purpose the first and second carriers can take a stackable form and for instance be mutually releasable.

By having each first carrier carry a second carrier it is not necessary to provide supply means for the further carrier. Instead, the second carrier can be removed from the first carrier at the position of the transition so that the first carrier can there function as further carrier, as described above. Co-displacing an empty carrier to the transition in this manner can provide the advantage that it is unnecessary to provide a generally complex installation for supplying empty carriers.

In another embodiment of the hydroponic system as described here the guide is configured to guide the carriers from the first zone to the second zone.

Carriers from the first zone are thereby guided to the second zone, whereby crop units in the gutters carried by these carriers can continue to grow in the second zone. In particular, it is not necessary for the gutters on these carriers, which have thus not been removed by the gutter displacing means, to be displaced. A larger hydroponic system can thereby be set up with a determined capacity of the gutter displacing means.

It is of course also possible to displace the carriers of the first zone to the second zone, for instance manually or using (the) gutter displacing means. The hydroponic system can thus have carriers in the second zone which come from the first zone and have carried gutters there. The hydroponic system optionally also has carriers in the second zone which did not carry gutters in the first zone and/or do not come from the first zone. As described above, these carriers can be supplied in the transition.

According to a specific alternative, the hydroponic system can be configured to guide carriers within the first zone and to guide carriers differing from the carriers in the first zone within the second zone. The carriers in the first and second zone may then differ from each other, although not necessarily so. For this alternative it is therefore possible to identify the carriers of the first and second zone as first carriers and second carriers.

It is possible to connect at least one gutter fixedly to the carrier, while at least one gutter is removable from the carrier. The removable gutter can then be removed by the gutter displacing means, while the other gutters remain connected, optionally releasably, to the carrier. This can reduce the error-proneness of the hydroponic system.

It is also possible to provide the carriers and the gutters with mutually co-acting connecting means, whereby the gutters are connectable to the carriers. The mutually co-acting connecting means are also releasable so that gutters are removable from the carriers. The mutually co-acting connecting means can for instance be mutually connectable and/or releasable by mutual sliding. Other mutually co-acting connecting means which may be used can be formed by a pin-hole connection.

In yet another embodiment of the hydroponic system as described here the carriers and the gutters have substantially the same length. Each gutter can thus be supported substantially wholly by the carrier, even when a plurality of gutters are carried adjacently of each other by a carrier.

The carriers can have a length of at least 7 metres, preferably of at least 10 metres and more preferably of at least 12 metres. Gutters having roughly this length can thus be carried, whereby a plurality of crop units can be cultivated per gutter.

In order to adapt the carriers and gutters to each other it is advantageous for the carriers to have an internal width which is substantially equal to a natural multiple of an external width of the gutters. This is because a plurality of gutters can thus be carried adjacently of each other by a single carrier, for instance with a relatively small intermediate distance or without intermediate distance.

By way of a non-limitative embodiment the carriers can be formed by a U-profile, wherein the U-profile defines a receiving space for at least partially receiving gutters so as to carry them. The gutters can thereby be carried adjacently of each other by the carrier, and be held together and/or held upright by the legs of the U-profile. The carrier can particularly extend under the gutters in order to carry them.

Alternatively, the carriers can be substantially flat. This can provide the advantage that gutters can be slid off the carriers. It is hereby no longer necessary to pick up the gutters. The gutters thereby need not be self-supporting, which enables the use of narrower and/or more cost-efficient gutters.

It is also possible to embody the carrier substantially flat and to connect it fixedly to only one gutter. In that case the carrier can be configured to carry a plurality of gutters in removable manner, in addition to the one fixedly connected gutter. The removably carried gutters can for instance be slid off the carrier in order to remove them.

Both the carriers and the gutters can be manufactured from plastic independently of each other. Plastic has previously been found suitable as material for the gutters. The use of plastic entails the risk that relatively narrow gutters can be unstable. As described herein, a carrier for the gutters is however provided, whereby in the case of plastic gutters the limited stability associated therewith is compensated for by the carrier.

It is also possible to envisage embodying the gutters from plastic, while the carriers are manufactured from a different material.

Also described herein is a method for cultivating a crop, wherein the method comprises the following steps of:

planting crop units of the crop in a plurality of gutters at the position of a first edge of a predetermined area, wherein the gutters are carried by the carriers at least per two;

guiding the carriers in a first direction which extends from the first edge to a second edge of the area;

harvesting the crop units at the position of the second edge;

wherein the method further comprises of:

removing at least one gutter from each carrier of the first zone in a transition from a first zone of the area adjacent to the first edge to a second zone of the area adjacent to the second edge.

As described above with reference to the hydroponic system, removal of the at least one gutter from each carrier results in more space for crop units in the remaining gutter or gutters of each carrier. Efficient use can thereby be made of surface area available for cultivation in that crop units are first situated relatively close together and, after removal of the at least one gutter, are situated further apart. Transplanting of individual crop units in particular is not necessary.

The method can further comprise the steps of:

supplying a further carrier in the transition; and moving the removed gutter to the further carrier.

In this way the removed gutter can be guided further on the further carrier so that the crop units growing in this gutter can be cultivated further.

Also described here is a set of a carrier and the plurality of gutters of the hydroponic system as described above. The set can have the above described features, alone or in any suitable combination, and so provide the advantages associated therewith.

The invention will be further elucidated below with reference to the accompanying figures, in which:

FIGS. 3A and 3B show schematically simplified top views of variants of the hydroponic system of FIG. 2;

The same elements are designated in the figures with the same reference numerals.

Figure 1:
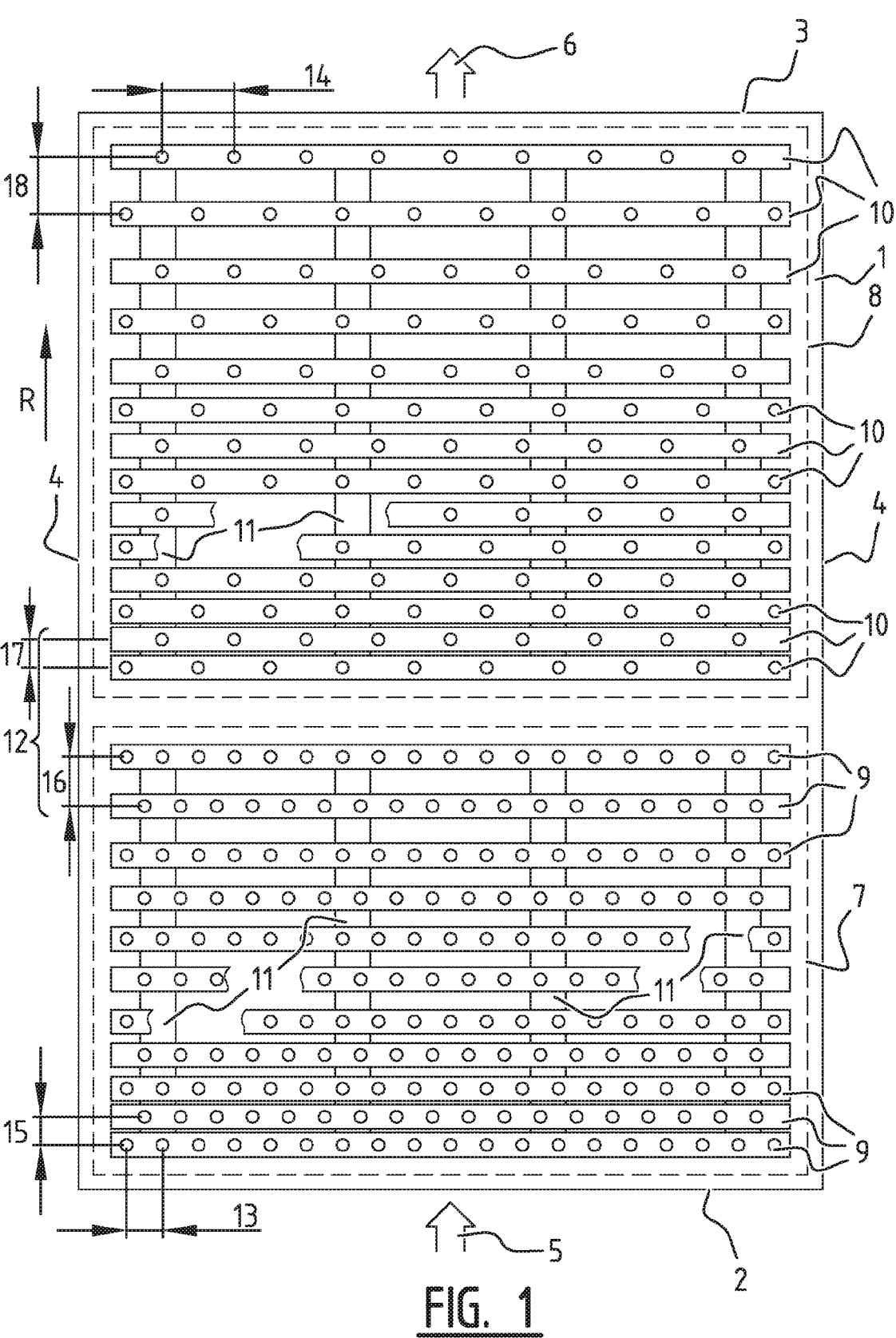
FIG. 1 shows schematically a top view of a hydroponic system.

FIG. 1 shows a hydroponic system for cultivating a crop, which is placed in a predetermined area 1. This predetermined area 1 is in practice preferably formed by a greenhouse or glasshouse or building or an outdoor installation. A section of a greenhouse or glasshouse can here also form the predetermined area, wherein another section of the greenhouse or glasshouse is used for other purposes. It is also possible for a plurality of systems for cultivating a crop to be placed in one greenhouse or glasshouse. A first edge 2 and a second edge 3 can be defined in predetermined area 1. First edge 2 and second edge 3 are situated opposite each other and define a first direction R extending from first edge 2 to second edge 3. This first direction is the direction in which the crop will move during cultivation. The predetermined area 1 further comprises lateral sides 4 which demarcate area 1.

At the position of first edge 2 crop units of a crop are introduced into the system for cultivating the crop, this being designated schematically in the figure with arrow 5, and at the position of second edge 3 fully grown crop units are harvested and thereby removed from the system for cultivating a crop, this being designated schematically with arrow 6. Introducing crop units into the system can for instance be done by supplying crop units from another system, optionally in gutters described below. The system for cultivating a crop comprises two zones, a first zone 7 adjacent to the first edge 2 of predetermined area 1 and a second zone 8 adjacent to the second edge 3 of predetermined area 1. First zone 7 and second zone 8 are further mutually adjacent at the position of a substantially centrally located section 12 of predetermined area 1. The substantially centrally located section is defined here as the location located at least a first distance removed from both first edge 2 and second edge 3, wherein the first distance is preferably at least 5% of the distance between first edge 2 and second edge 3, more preferably at least 10%. Substantially centrally thus does not imply that it must lie at the mathematical midpoint between the first edge and the second edge.

A plurality of gutters, designated respectively with reference numerals 9 and 10, are placed in both first zone 7 and second zone 8. Each gutter extends here substantially parallel to first edge 2 and second edge 3, and a guide 11 is provided for guiding gutters 9, 10 in the first direction. The first direction is substantially perpendicular to gutters 9, 10. In the embodiment of FIG. 1 the guide 11 takes the form of a plurality of support profiles which are placed substantially horizontally (in the longitudinal direction from edge 2 to 3). In the transverse direction (direction of the gutters) the support profiles lie at an incline corresponding to the drainage of the gutters. The number of support profiles (from edge 2 to 3) can be adjusted here on the basis of the support requirements of the gutters. Although it is possible to interrupt the support profiles in their longitudinal direction at the position of transition 12 from first zone 7 to second zone 8 as shown in FIG. 1, the support profiles can of course also continue uninterrupted. The support profiles of guide 11 preferably have a flat upper side such that gutters 9, 10 can slide on the flat upper side of the support profiles. It is usually the case in practice that second zone 8 is divided in two in respect of the guide system. The support profiles and therefore also the guide system change at the point of division.

In the embodiment of FIG. 1 the technical difference between first zone 7 and second zone 8 lies in the intermediate distance between adjacent crop units in the gutters. The intermediate distance 13 between crop units in gutters 9 of first zone 7 is particularly considerably smaller than the intermediate distance 14 between crop units in gutters 10 of second zone 8. Apart from this difference between intermediate distances 13 and 14, the technical construction and the operation of the system will be substantially the same in first zone 7 as in the second zone. Zone 7 now has only one driven pull rod system (due to the limited length).

Characteristic of the system with two zones 7 and 8 shown in FIG. 1 is that a transition 12 can be designated where at least part of the crop units are transplanted or transferred from one gutter to another gutter. In the exemplary embodiment as shown in FIG. 1, all crop units are transferred individually from gutter 9 at the position of transition 12 to one or more gutters 10 of second zone 8 at the position of the transition. This can take place automatically, mechanically or with intervention by a worker. In the embodiment of FIG. 1 gutters 9 remain in first zone 7 and are carried back to first edge 2. Gutters 10 of second zone 8 also remain in this zone, and when they reach the position of second edge 3 they are carried back to transition 12 and there filled once again. Alternatively, the gutters continue from first zone 7 to second zone 8, and gutters are added at the position of transition 12 so that part of the crop units can be transferred or transplanted from the gutters in the first zone to the additional gutters in order to thus increase the intermediate distance between adjacent crop units in the gutters. For the sake of clarity the space between two crop units is in this description referred to with the term intermediate distance, while the space between two gutters is referred to with the term distance.

In each zone 7, 8 gutters 9, 10 move in the first direction such that a start and an end can be defined for each zone 7, 8, wherein the end of the zone is the section where the gutters arrive when they move in the first direction. At the position of the start of each zone 7, 8 gutters 9, 10 are positioned with a first distance between adjacent gutters 9, 10, which first distance is designated respectively with reference numerals 15 and 17. The first distance is minimal and, depending on the configuration of the system, can differ for first zone 7 and second zone 8. Distance between gutters is defined as the distance between the central axes of the gutters. The first distance 17 of gutters 10 in second zone 8 at the position of transition 12 is preferably greater than the width of the gutter+0 mm, preferably greater than the width of the gutter+5 mm (+1 mm), more preferably greater than the width of the gutter+10 mm, such that gutters 10 do not come into contact with each other at the position of transition 12. When gutters 10 in second zone 8 at the position of transition 12 are not pressed against each other, leaves of the crop are not pressed between adjacent gutters 10 either, such that the crop is not damaged. Advancing of gutters 10 during filling of the gutters or filling of at least part of the gutters along transition 12 is however considerably more difficult when gutters 10 may not be pressed against each other. At the position of the end of each zone 7, 8 gutters 9, 10 display a second distance between adjacent gutters, designated respectively with reference numerals 16 and 18, which is considerably greater than first distance 15, 17. The second distance is a predefined maximum distance and, depending on the configuration of the system, can differ for first zone 7 and second zone 8.

The distance between adjacent gutters is increased from the first distance 15, 17 to the second distance 16, 18 in stepwise manner or continuously between start and end of the zone, over the length of each zone 7, 8. The effect hereof is that the number of crop units per square metre decreases from the start of each zone toward the end of each zone. This has the result that the surface area per crop unit increases in each zone from the start toward the end, which allows each crop unit to grow and also to be given the surface area necessary for this purpose. The surface area at the start of each zone is optimally utilized here because the distance between the gutters is small when the crop units are also small and require less surface area per crop unit, and each crop unit is given sufficient space to grow in each zone because the distance between gutters increases from the start toward the end of each zone.

At the position of transition 12 the end of first zone 7 is adjacent to the start of second zone 8. The gutters of the first zone at the position of transition 12 will hereby display a considerably greater distance between adjacent gutters than gutters 10 of second zone 8 at the position of transition 12. Because of the combination of the considerable increase in the intermediate distance of crop units in one gutter in transition 12 from first zone 7 to second zone 8 and the considerable decrease in the distance between adjacent gutters along transition 12 from the first zone to second zone 8, the number of crop units per m² can remain substantially constant, or conversely differ, along the transition from first zone 7 to second zone 8. Tests have shown that this way of working with two zones 7 and 8 allows a crop to be cultivated in considerably more efficient manner. The number of crop units per m² in predetermined area 1 can hereby decrease continuously and/or in stepwise manner from first edge 2 toward second edge 3. The crop units can be planted here at the position of first edge 2 at a number of crop units per m² which is optimized as a function of the size of the crop units which are planted. At the position of second edge 3 the crop units are harvested and each crop unit has reached full growth, and the number of crop units per m² is optimized as a function of the size of the fully grown crop units. This allows cultivation of a crop in a surface area-efficient manner.

Figure 2:
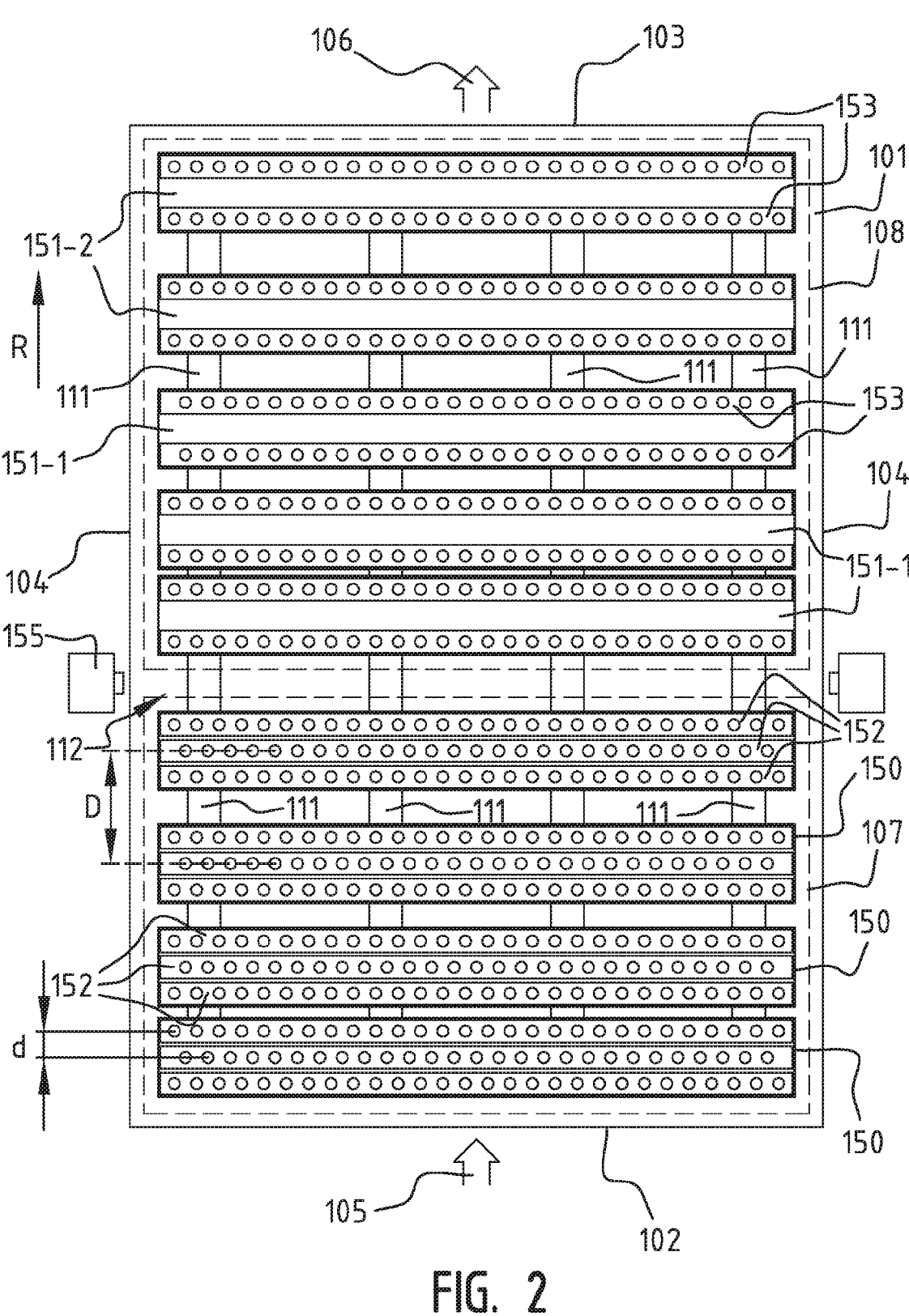
FIG. 2 shows schematically a top view of another hydroponic system, with gutter systems according to the invention therein.

FIG. 2 shows a hydroponic system that is largely identical to that of FIG. 1, except where described differently. The same reference numerals are therefore used in FIG. 2 as in FIG. 1, but increased by 100 (one hundred) for the same elements of FIG. 1. Only the differences are discussed hereinbelow.

Firstly, support profiles of the guides 111, referred to hereinafter simply as guides, are configured to guide carriers 150, 151 in the first direction. In the figure these are carriers 151-1 and 151-2, discussed separately below and here designated together as carriers 151. In FIG. 2 there are separate guides 111 for the first zone 107 and second zone 108, although it is also possible to envisage having guides 111 continue through the two zones 107, 108, or to provide only one zone. Carriers 150, 151 are configured to carry at least two parallel gutters 152, 153. In this case each carrier 150, 151 is configured to carry exactly three gutters 152, 153. For this purpose carriers 150, 151 are roughly three times wider than gutters 152, 153. To carry a different number of gutters 152, 153 carriers 150, 151 can take a wider or less wide form. Carriers 150, 151 have substantially the same length as gutters 152, 153. In this case said length is about 12 metres. The shown carriers 150, 151 and gutters 152, 153 are manufactured from plastic. The gutters 152 in first zone 107 lie relatively close together, for instance (almost) against each other. A gutter distance d between gutters on the same carrier 150 is thus relatively small. Carriers 150 are guided in the first direction R by guides 111. Although this is not essential, the carrier distance D between carriers 150 is increased gradually, so further along in the first direction. The distance between two gutters on different carriers of course also becomes greater thereby, while the gutter distance d between gutters 152 on one carrier remains the same. It has been found by applicant that the increasing carrier distance D can suffice to give crop units more space to grow, despite the distance d between gutters 152 on the same carrier 150 not changing, when two gutters 152 are provided per carrier 150. When there are more gutters 152 per carrier 150, this effect may not be sufficient.

As in the system of FIG. 1, in the hydroponic system of FIG. 2 a first zone 107 and a second zone 108 can be allocated. The first and second zone 107, 108 are separated by a transition 112. Gutter displacing means 155 are disposed at the position of the transition 112. Gutter displacing means 155 can be any type of suitable means able to displace gutters from carrier to carrier. They are therefore shown highly schematically. The shown form should not be deemed limitative for the type of gutter displacing means 155. In this embodiment the gutter displacing means 155 are configured to remove one gutter from each carrier 150 in first zone 107 by sliding the gutters relative to their carrier. The other two gutters 152, 153 which remain in carrier 150 maintain their position relative to their carrier 150. Crop units in the remaining gutters 153 are thereby given more space. It is of course also possible to remove an outer gutter 152 and to rearrange the remaining gutters 153 relative to each other. Gutter displacing means 155 can be used for this purpose. As can be seen in FIG. 2, guides 111 are uninterrupted between the first and second zone 107, 108. Guides 111 are therefore configured to guide carriers 150, 151 from first zone 107 to second zone 108. Alternatively, guides 111 can be interrupted so that there are separate guides 111 in respectively first zone 107 and second zone 108. In the second zone 108 there are therefore a number of carriers 151-2, these carrying precisely two gutters 153 in this embodiment, which come from first zone 107. The hydroponic system is further provided with supply means (not shown in FIG. 2) for supplying a further carrier 151-1 at the position of the transition. The supply means can for instance be formed by said gutter displacing means 155, by a separate robot or by other suitable means. The further carrier 151-1 can take the same form as the other carriers 150, 151-2, but differs therefrom in that it does not come directly from first zone 107. The further carrier 151-1 can thus be supplied without carrying gutters, at the position of transition 112. The further carrier 151-1 is there guided by guides 111 through second zone 108. Gutter displacing means 155 are configured to displace the gutters 152 which are removed from the carriers 150 of first zone 107 to the further carrier 151-1. In this case two gutters 153 are in each case provided on the further carrier 151-1 so that each carrier 151 in second zone 108 carries the same number of gutters 153, i.e. precisely two gutters 153.

Figure 3A:
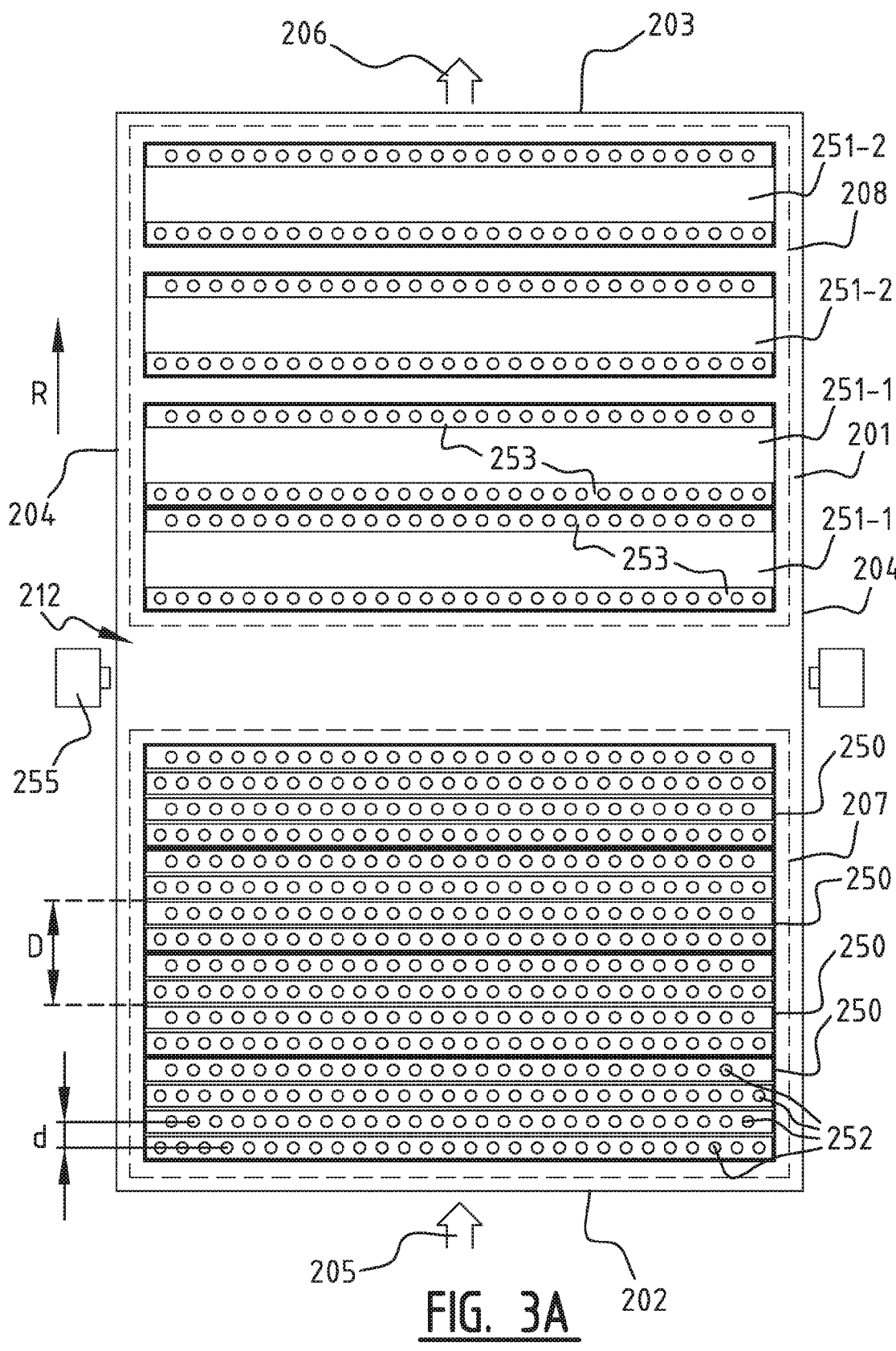

FIGS. 3A and 3B show a hydroponic system which is the same as that of FIG. 2, in so far as it is not stated otherwise below. Reference numerals of the same elements in FIGS. 3A and 3B are therefore in each case increased by one hundred (100) relative to the respective foregoing figure. For the sake of simplicity, not all details of FIG. 2 are repeated in FIGS. 3A and 3B.

In the variant of FIG. 3A four gutters 252 are carried by each carrier 250 in first zone 207. Although the carriers 250 in first zone 207 are displaced in the first direction R, the distance D between carriers 250 does not increase here. At the position of transition 212 two gutters 252 are taken from carrier 250 by gutter displacing means 255 and displaced to a further carrier. These gutters 252, and the gutters remaining on carrier 250, are displaced toward the front edge and rear edge, as seen in the first direction, of their respective carrier 251 by gutter displacing means 255. The distance between two gutters 253 in second zone 208 is thereby greater than in first zone 207. In second zone 208 the carriers 251 are also guided in the first direction R, and here guided increasingly further apart, so that a distance D between mutually adjacent carriers 251 increases gradually. Crop units in the gutters 253 in second zone 208 are thereby gradually given more space.

The variant of FIG. 3B is only discussed below in so far as it differs from that of FIG. 3A. In the variant of FIG. 3B four gutters 352 are once again carried by each carrier 350 in first zone 307. In second zone 308 two gutters 353 are once again displaced in each case to a further carrier. In contrast to that which is the case in FIG. 3A, gutters 353 in second zone 308 are here however not placed at the front edge and rear edge of carriers 351, but each closer toward the centre of their respective carrier 351. Although the distance d between two gutters 353 in second zone 308 is therefore greater than in first zone 307, it is still not as great as was the case in the variant of FIG. 3A. A further zone 308' connecting to second zone 308 at a further transition 312' has been added. Further gutter displacing means 355' are also provided. The further gutter displacing means 355' are configured to rearrange gutters 353 on their carrier 351 and so bring about an even greater distance d between gutters 353. The maximum distance between gutters 353' in further zone 308' is thus achieved with an intermediate step.

Figures 4, 5:
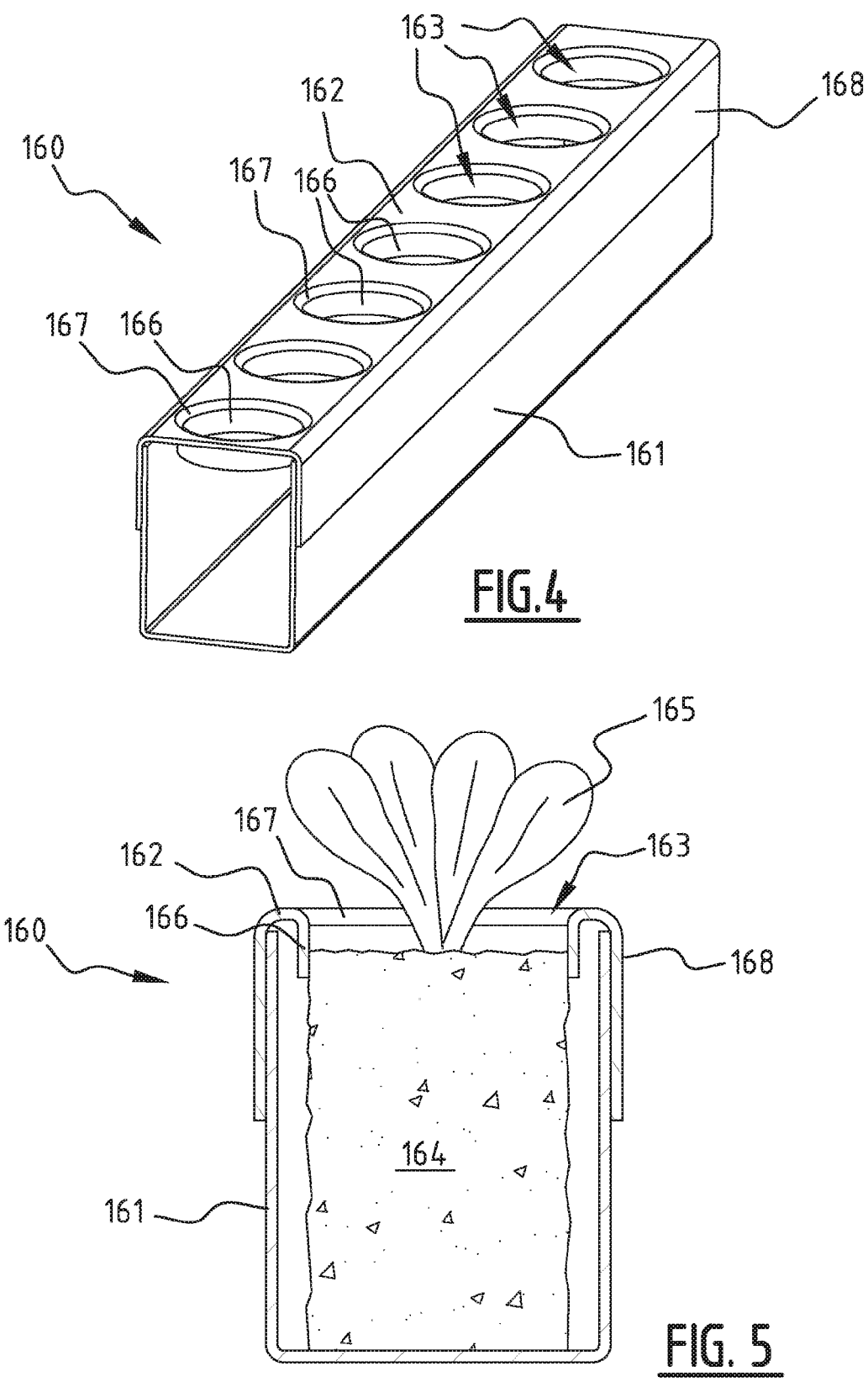
FIG. 4 shows schematically a perspective view of a gutter system according to the invention.
FIG. 5 shows schematically a side view of the gutter system of FIGS. 2-4, with a substrate and a crop unit therein.

FIGS. 4-7 show an advantageous gutter system 160 according to the invention, which can form the gutters 152, 153. The shown gutter system 160 is therefore once again about 12 metres long. Gutter system 160 comprises a gutter 161 and an upper surface 162. A plurality of openings 163 are arranged in the upper surface 162. These openings 163 define an intermediate distance in the longitudinal direction of gutter 161. As can be seen most clearly in FIG. 4, gutter 161 forms a channel in which substrates 164 can be placed. Substrates 164 are used for having crop units 165 of a crop grow therein. Gutter system 160 further has a flange 166 at the position of each opening 163. The flanges 166 extend downward from an edge of the opening 163. Flanges 166 thereby in each case form a stop for a respective substrate 164, below the upper surface 162. As can be seen in FIG. 4, in this case flanges 166 extend over the whole edge of their openings 163. Openings 163 are here circular, and flanges 166 take the form of a hollow cylinder. An inner diameter of openings 163 is about 2.3 cm. When they are placed in the channel, substrates 164 extend to a position below upper surface 162, but at least to the height of flanges 166. Flanges 166 thereby hold the substrates 164 in place.

Provided close to the upper surface 162, at the edge of each opening 163, is a chamfering 167. The chamfering 167 in each case connects the upper surface 162 to the flange 166. Owing to chamfering 167, a guide is created for guiding substrates 164, which are introduced through opening 163, into the channel They are guided to the centre of the opening 163 by the chamfering 167.

Upper surface 162, flange 166 and chamfering 167 are here formed from integrally. This results in a strong connection. In the shown gutter system 160 the upper surface 162, flange 166 and chamfering 167 form part of a lid 168 which is separate from gutter 161. Lid 168 can be placed on gutter 161 and so connected thereto. Lid 168 can of course also be removed from the gutter again. The lid can thus for instance be removed for the purpose of removing substrates 164 from the channel, whereby cleaning of gutter 161 and/or of lid 168 is facilitated. Such a gutter construction can be applied in a system as shown in FIG. 1 and can be applied in a system as shown in FIGS. 2 and 3A and 3B.

Figures 6, 7:
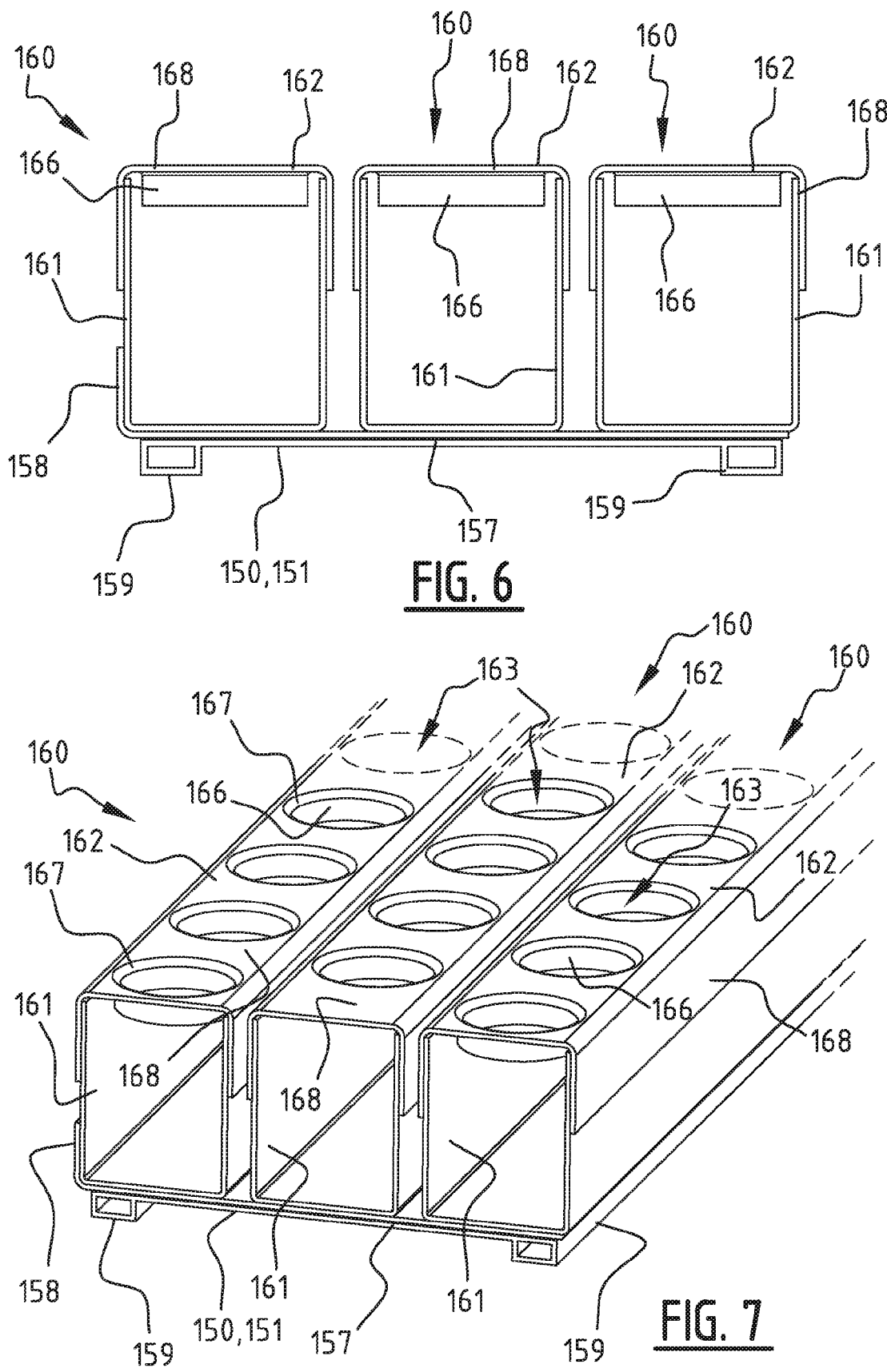
FIGS. 6 and 7 show schematically respectively a side view and a perspective view of a gutter system of FIGS. 2-5 and a carrier.

FIG. 6 shows that a plurality of gutter systems 160, in this case three, are carried by a carrier 150, 151. The carrier 150, 151 is also shown in more detail here. The carrier 150, 151 is substantially formed by an angled profile and therefore has a flat base 157 and an upright 158. A receiving space is defined on base 157 and adjacently of the upright. Gutter systems 160 are placed in the receiving space. An inner dimension of carrier 150, 151, i.e. a dimension of the receiving space in which the gutter systems 160 can be placed, is here adjusted to an outer dimension of gutter systems 160. In this case said inner diameter is about three times greater than said outer dimension, whereby three gutter systems 160 can be carried adjacently of each other with a relatively small mutual distance.

It is of course possible to adjust the pitch distance of openings 163 or the dimensions of openings 163 to a desired type of crop for cultivating. It is possible here to envisage fitting different lids 168 on the same gutter 161 and so forming a set of lids 168 for any desired type of crop.

Figure 8:
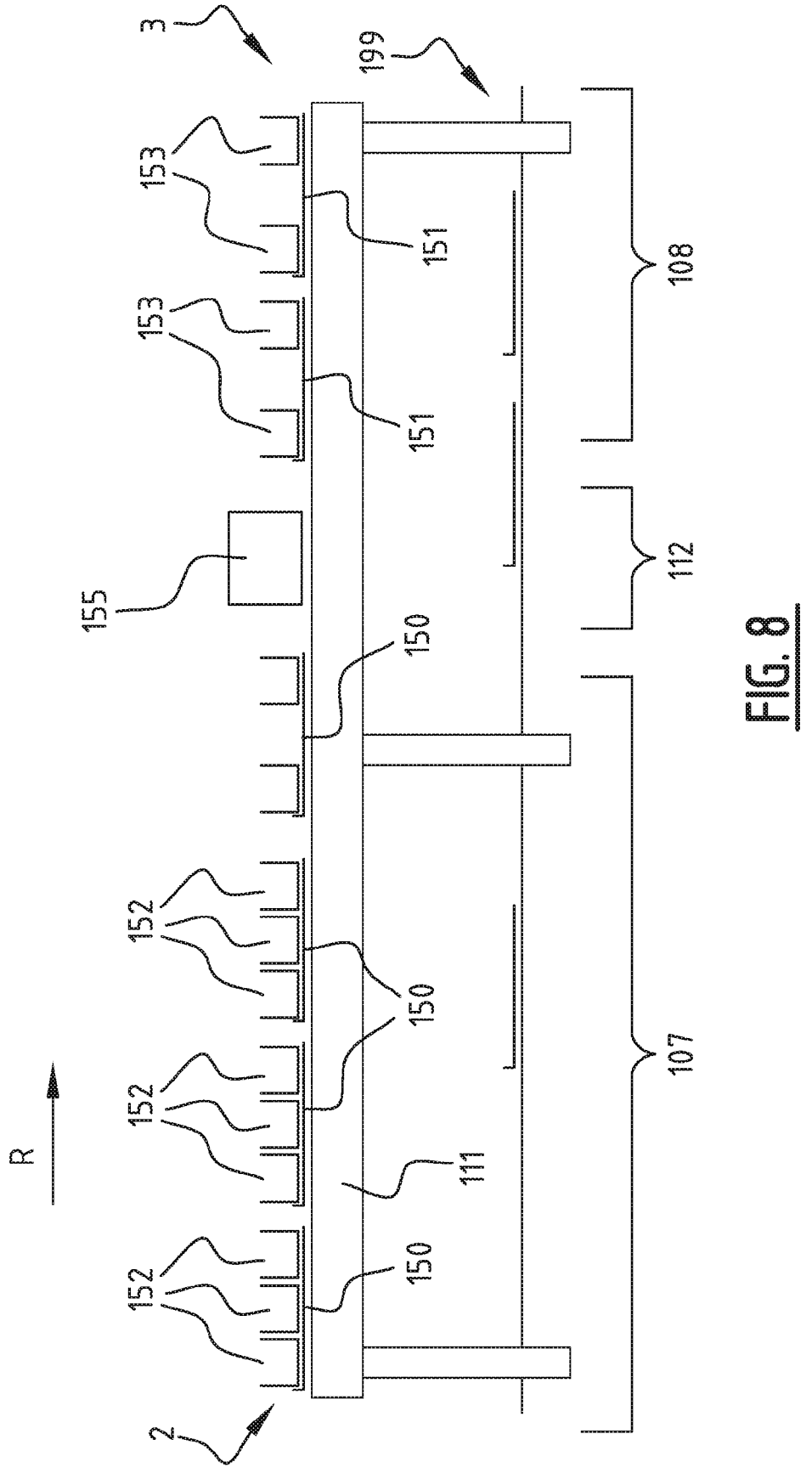
FIG. 8 shows schematically a side view of the hydroponic system of FIG. 2.

FIG. 8 shows a highly schematic side view of the hydroponic system of FIG. 2. FIG. 7 shows carriers 150, 151 and gutters 152 and 153 in simplified form. The skilled person will appreciate that the gutters 152, 153 in particular can be formed as described above with reference to FIGS. 3-6, or can take a traditional form. It can once again be seen in FIG. 8 that carriers 150, 151 are guided in the first direction R. After arriving in transition 112, a gutter 152 is removed from each carrier 150. The gutter is displaced to a further carrier 151. The distance between gutters 153 in the same carrier 151 in second zone 108 is thereby greater in second zone 108 than in first zone 107. As is also done in first zone 107, in second zone 108 the distance between carriers 151 can be chosen in accordance with the growth stage of crop units in the gutters 153, for instance by gradually increasing the distance between carriers 151. Further provided are supply means 199 which supply empty carriers at the position of the transition, along the underside of the hydroponic system.

Figure 9:
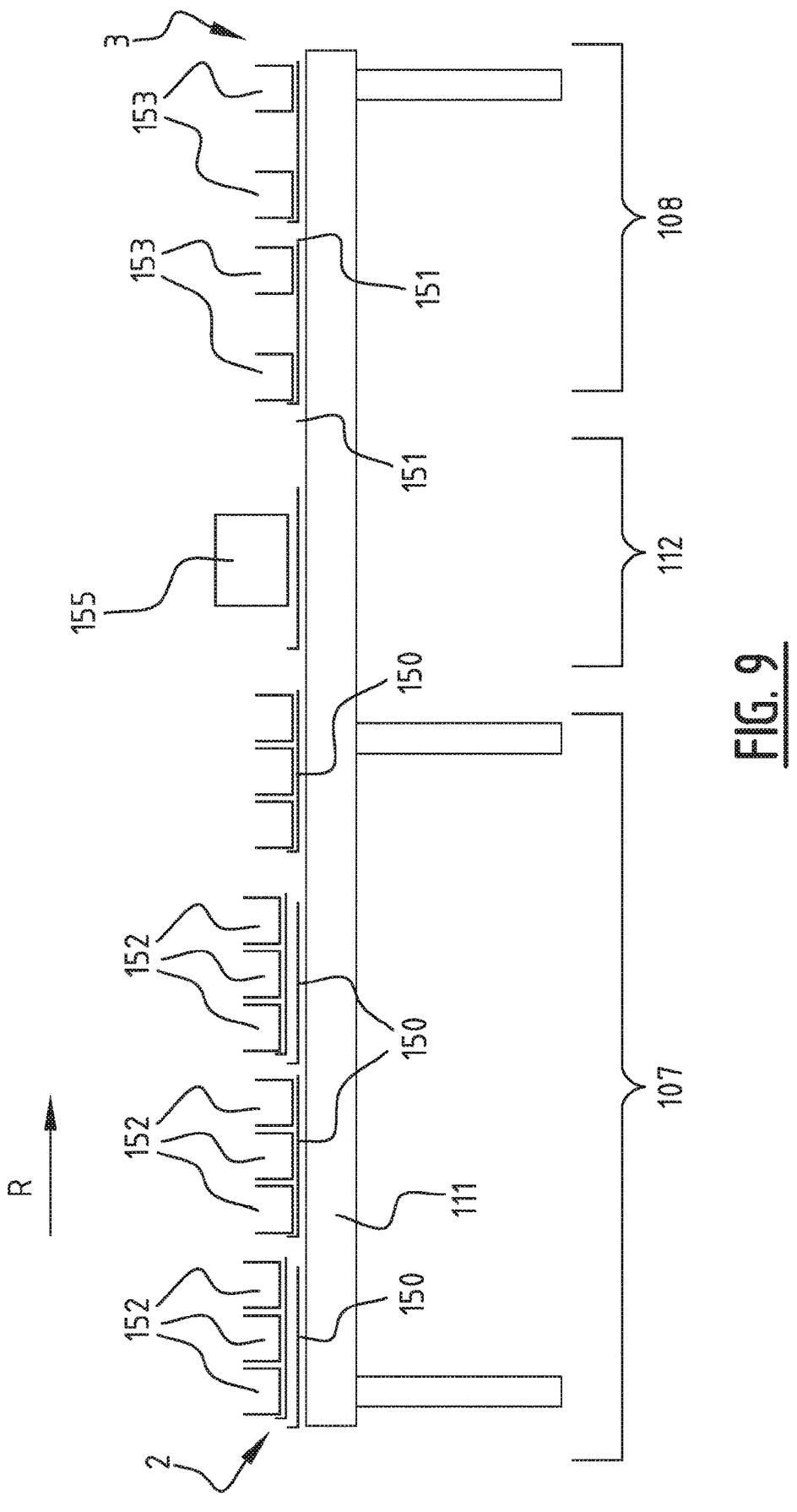
FIG. 9 shows schematically a side view of another embodiment of the hydroponic system according to the invention.

In the gutter system of FIG. 9 the supply means 199 have not been provided. Instead, carriers 150 are supplied stacked per two in first zone 107. Gutters 152 are placed on the stacked carriers. At the position of transition 112 the gutter displacing means 155 are used to separate the stacked carriers 152 from each other so that an empty carrier becomes available in each case. The gutter displacing means 155 are further configured to displace in each case one gutter 152 per full carrier 150 to a further carrier, so that each carrier 151 carries two gutters 153 in second zone 108. It is of course possible to stack more or fewer carriers 150 in the first zone and to stack a plurality of carriers 150 on top of each other, depending on the required number of carriers 151 in the second zone 108.

The description discusses in each case an embodiment in which a carrier carries three gutters in the first zone and carries two gutters in the second zone. The skilled person will appreciate that other embodiments can also be envisaged. A carrier can thus carry two, three, four or more gutters in the first zone. A carrier in the second zone can carry one, two or three gutters, wherein the number of gutters in a carrier of the second zone is always at least one less than the number of gutters in a carrier of the first zone.

Although the invention is elucidated above on the basis of a number of specific examples and embodiments, the invention is not limited thereto. The invention rather also covers the subject matter defined by the following claims.

The invention claimed is:

1. A gutter system for use in a hydroponic system for cultivating a crop, comprising a gutter and a lid having an upper surface, wherein arranged in the upper surface are a plurality of openings which are mutually separated in a longitudinal direction of the gutter, such that the gutter forms a channel in which substrates for having crop units of the crop grow therein are placeable via the openings, wherein the upper surface is provided at the position of each of the plurality of openings with a flange which extends substantially perpendicularly relative to the upper surface from an edge of the opening;

wherein the flange extends below a bottom surface of the lid to form a stop for a substrate of said substrates disposed in the gutter to thereby prevent the substrate from extending above the upper surface such that the lid reduces or eliminates substrate displacement and reduces the risk of crop contamination during automated harvesting; and wherein the flange does not extend above the upper surface of the lid.

2. The gutter system according to claim 1, wherein the flange extends downward from the edge of the opening such that the formed stop is situated below the upper surface.

3. The gutter system according to claim 1, wherein each flange extends over substantially the whole edge of the respective opening.

4. The gutter system according to claim 3, wherein the openings take a substantially circular form, and the flanges take the form of hollow cylinders.

5. The gutter system according to claim 1, wherein a chamfering which connects the upper surface to the flange is provided at the edge of each opening in order to thus simplify access of the substrate to the channel through the opening.

6. The gutter system according to claim 5, wherein the upper surface, the flange and the chamfering are formed integrally from one piece.

7. The gutter system according to claim 1, further comprising a lid for the gutter, wherein the lid comprises the upper surface and wherein the lid and the gutter are releasably connectable.

8. The gutter system according to claim 1, wherein the gutter has a length of at least 7 metres.

9. The gutter system according to claim 1, wherein a pitch distance between two adjacent openings of an upper surface is one of: greater than 1.5 cm and smaller than 10 cm.

10. A gutter system for use in a hydroponic system for cultivating a crop, comprising a gutter and a lid having an upper surface, wherein arranged in the upper surface are a plurality of openings which are mutually separated in a longitudinal direction of the gutter such that the gutter forms a channel in which substrates for having crop units of the crop grow therein are placeable via the openings, wherein the upper surface is provided at the position of each of the plurality of openings with a flange which extends substantially perpendicularly relative to the upper surface from an edge of the opening, wherein the flange extends below a bottom surface of the lid to form a stop for a substrate of said substrates disposed in the gutter to thereby prevent the substrate from extending above the upper surface thereby minimizing substrate displacement and reducing the risk of crop contamination during automated harvesting, and where the flange does not extend above the upper surface; and wherein the gutter system comprises a further lid which comprises a further upper surface and is releasably connectable to the gutter, and wherein arranged in the further upper surface are further openings which are mutually separated in a longitudinal direction of the further lid.

11. The gutter system according to claim 10, wherein a pitch distance and/or cross-sectional dimension of the openings differs from respectively a further pitch distance or further cross-sectional dimension of the further openings.

12. The gutter system of claim 1, wherein the lid further comprises an outer flange that extends substantially perpendicularly relative to the upper surface, the outer flange further extending below a bottom surface of the lid to engage an outer surface of the gutter.

13. The gutter system of claim 10, wherein the lid further comprises an outer flange that extends substantially perpendicularly relative to the upper surface, the outer flange further extending below a bottom surface of the lid to engage an outer surface of the gutter.

* * * * *